United States Patent [19]

Drent

[11] Patent Number: 5,162,493

[45] Date of Patent: Nov. 10, 1992

[54] POLYMERIZATION OF CO/OLEFIN/FUNCTIONALLY SUBSTITUTED OLEFIN WITH TETRA ALKYL DIPHOSPHINE

[75] Inventor: Eit Drent, Amsterdam, Netherlands

[73] Assignee: Shell Oil Company, Houston, Tex.

[21] Appl. No.: 712,300

[22] Filed: Jun. 10, 1991

[30] Foreign Application Priority Data

Jun. 22, 1990 [NL] Netherlands .......................... 9001432

[51] Int. Cl.$^5$ ............................................. C08G 67/02
[52] U.S. Cl. ................... 528/392; 528/220; 528/271
[58] Field of Search .................. 528/392, 271, 220

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 3,835,123 | 9/1974 | Nozaki | 260/94.9 B |
| 4,835,250 | 5/1989 | Drent | 528/392 |
| 4,841,020 | 6/1989 | Drent | 528/392 |

FOREIGN PATENT DOCUMENTS

| | | |
|---|---|---|
| 121965 | 10/1984 | European Pat. Off. . |
| 251373 | 1/1988 | European Pat. Off. . |
| 272727 | 6/1988 | European Pat. Off. . |
| 376364 | 7/1990 | European Pat. Off. . |

*Primary Examiner*—Harold D. Anderson

[57] ABSTRACT

An improved process for the production of linear alternating polymers of carbon monoxide, functionally-substituted ethylenically unsaturated compound wherein at least one carbon atom separates the functional substitution and the ethylenic unsaturation and, optionally, an ethylenically unsubstituted hydrocarbon, which comprises contacting the carbon monoxide and unsaturated compound under polymerization conditions in the presence of a reaction diluent and a catalyst composition formed from a compound of palladium, the anion of a strong non-hydrohalogenic acid and a tetraalkyl diphosphine liqand.

18 Claims, No Drawings

5,162,493

POLYMERIZATION OF CO/OLEFIN/FUNCTIONALLY SUBSTITUTED OLEFIN WITH TETRA ALKYL DIPHOSPHINE

FIELD OF THE INVENTION

This invention relates to an improved process for the production of linear alternating polymers of carbon monoxide, a functionally substituted ethylenically unsaturated compound and, optionally, an ethylenically unsaturated hydrocarbon. More particularly, the invention relates to such a polymerization process conducted in the presence of a catalyst composition formed from, in part, a tetraalkyl diphosphine ligand.

BACKGROUND OF THE INVENTION

Polymers containing units of carbon monoxide and one or more ethylenically unsaturated compounds have been known for some time. Brubaker et al, U.S. Pat. No. 2,495,286, produced such polymers in the presence of free radical initiators such as peroxy compounds. Linear alternating polymers of carbon monoxide and ethylenically unsaturated hydrocarbons are disclosed by Nozaki who employed catalysts comprising arylphosphine complexes of palladium moieties in conjunction with certain inert solvents. See, for example, U.S. Pat. No. 3,694,412. Nozaki also disclosed the use of unsaturated compounds other than hydrocarbons, e.g., vinyl acetate. In published European Patent Application No. 121,965 there is disclosed, in the production of linear alternating polymers, the use of catalyst compositions formed from a compound of palladium, the anion of a strong non-hydrohalogenic acid and a bidentate ligand of phosphorus. Published European Patent Application No. 251373 discloses the use of non-hydrocarbyl unsaturated compounds in which the functional group is directly attached to a carbon atom of the ethylenic unsaturation, e.g., vinyl acetate or methyl acrylate. Nozaki, U.S. Pat. No. 3,835,123, discloses the use of doubly unsaturated compounds such as vinyl crotonate or vinyl hexanoate. It is not clear which of the unsaturated linkages serves as the site for the polymerization. In Drent, U.S. Pat. No. 4,841,020, the production of linear alternating polymers of carbon monoxide and non-hydrocarbyl ethylenically unsaturated compounds is disclosed in which at least one carbon atom separates the ethylenic unsaturation and the functional substitution. Such polymers are produced in the presence of a catalyst composition formed from, in part, a tetraaryl diphosphine. The use of other types of phosphine in the formation of catalyst compositions for linear alternating polymer production is known, for example, from published European Patent Application 376,364 which employs tetraalkyl diphosphines but the resulting catalyst compositions are not used to produce linear alternating polymers containing moieties of functionally-substituted ethylenically unsaturated compounds.

The linear alternating polymers, now known as polyketones or polyketone polymers, are characterized by a plurality of carbonyl groups occurring in the polymeric chain. Broadly speaking, the polyketones are thermoplastic and have established utility in the production of shaped articles such as containers for food and drink by techniques conventional for thermoplastic polymers. In addition, the polyketones are chemically modified by reaction at the carbonyl groups. For example, catalytic reduction in the presence of ammonia or hydrogen sulfide leads to production of polyamines or polythiols, respectively. Greater opportunities for chemical modification of the polymers exist when one or more of the ethylenically unsaturated monomers of the linear alternating polymers contains functional substitution. For example, hydrolysis of a linear alternating polymer produced from a monomer having ester functional groups would lead to polymers with acid or alcohol moieties pendant from the polymer chain.

In the process of U.S. Pat. No. 4,841,020 the use of tetraaryl diphosphines as catalyst composition precursors results in the production of functionality-substituted linear alternating polymers which can be chemically modified. The polymers of U.S. Pat. No. 4,841,020 have a disadvantage, however, in that they are of relatively low molecular weight which tends to limit their use in some applications. It would be of advantage to provide a process for the production of linear alternating polymers of carbon monoxide and functionally-substituted ethylenically unsaturated compounds which retain the opportunity for chemical modification of the polymer but are of a higher molecular weight.

SUMMARY OF THE INVENTION

The present invention provides an improved process for the production of linear alternating polymers of carbon monoxide, certain functionally-substituted ethylenically unsaturated compounds and, optionally, ethylenically unsaturated hydrocarbon. More particularly, the invention relates to the production of copolymers of carbon monoxide and the functionally-substituted unsaturated compound or terpolymers which additionally contain moieties of ethylenically unsaturated hydrocarbon in the presence of a catalyst composition formed from, inter alia, a tetraalkyl diphosphine ligand.

DESCRIPTION OF THE INVENTION

The process of the invention is conducted by contacting carbon monoxide, a functionally-substituted ethylenically unsubstituted compound having at least one carbon atom between the ethylenic unsaturation and the functional substitution and, optionally, an ethylenically unsaturated hydrocarbon. The contacting takes place under polymerization conditions in the presence of a reaction diluent and a catalyst formed from a compound of palladium, the anion of a strong non-hydrohalogenic acid and a tetraalkyl diphosphine ligand. The process of the invention produces linear alternating polymer of relatively high molecular weight.

The functionality-substituted polymers of the invention are Ω-substituted vinyl compounds having up to 20 carbon atoms inclusive, preferably having up to 12 carbon atoms inclusive, with at least one carbon atom separting the ethylenic unsaturation and the functional group substituent. The preferred functionally-substituted compounds are represented by the formula

$$CH_2=CH\text{-}(CH_2)_n Z \qquad (I)$$

wherein n is a number from 1 to 14 inclusive, preferably from 1 to 8 inclusive, and Z is —OY', —CO$_2$Y', —COY or —OCOY wherein Y is lower alkyl of up to 4 carbon atoms inclusive and Y' is hydrogen or Y. Thus the functional groups suitably present in the Ω-substituted vinyl compounds are hydroxy, alkoxy, carboxy, carboalkoxy, acyl or acyloxy. Illustrative of such functionally-substituted ethylenically unsubstituted compounds are 3- butenol-1, 10-undecenyl alcohol, methyl 10-undecenoate, 10-undecenoic acid, 7-octenoic acid, methyl 10-undecenyl ether, allyl acetate and 10-undecenyl acetate. The preferred functionally-substituted ethylenically unsaturated compounds are alcohols such as 3-butenol-1 or carboxylic acids such as 10-undecenoic acid.

When the polymers of the invention contain the optional moieties of an ethylenically unsaturated hydrocarbon, the ethylenically unsaturated hydrocarbon will contain up to 10 carbon atoms inclusive and is preferably a straight-chain aliphatic α-olefin such as ethylene, propylene, butylene, 1-hexene, 1-octene and 1-decene. Especially preferred as the optional ethylenically unsaturated hydrocarbon is ethylene.

The polymeric chain of the linear alternating polymers of the invention are represented by the repeating formula

 (II)

wherein D is the moiety of a functionally-substituted ethylenically unsaturated compound of the above formula I and G is the moiety of the ethylenically unsaturated hydrocarbon and the ratio of y:x is no more than about 0.1. When the polymers of the invention are copolymers of carbon monoxide and the functionally-substituted ethylenically unsaturated compound there will be no unsaturated hydrocarbon present and the copolymers are represented by the above formula II wherein y is zero. When y is other than zero, i.e., terpolymers are produced, the —CO—(D)— units and the —CO—(G)— units are found randomly throughout the polymer chain and the preferred ratio of y:x is no more than about 0.05. The end groups or "caps" of the polymer chain will depend upon what materials were present during the polymerization and how or whether the polymer has been purified. The precise nature of the end groups will have little significance so far as the overall properties of the polymers are concerned so that the polymers are fairly represented by the polymer chain as depicted above.

The polymerization is conducted by contacting in a suitable reactor the carbon monoxide, the functionally-substituted ethylenically unsaturated compound and, optionally, ethylenically unsaturated hydrocarbon, under polymerization conditions in the presence of a reaction diluent and a catalyst composition formed from a compound of palladium, the anion of a strong non-hydrohalogenic acid and a tetraalkyl diphosphine ligand. The compound of palladium is suitably a palladium carboxylate, particularly a palladium alkanoate, and palladium acetate, palladium propionate, palladium butyrate and palladium hexanoate are satisfactory. Palladium acetate is particularly preferred as the compound of palladium. The acid whose anion is a precursor of the catalyst composition is a strong non-hydrohalogenic acid, preferably having a pKa below 2. The acid is suitably an inorganic acid such as sulfuric acid or perchloric acid or is an organic acid including carboxylic acids such as trichloroacetic acid, dichloroacetic acid, trifluoroacetic acid and difluoroacetic acid, as well as sulfonic acids such as methanesulfonic acid, trichloromethanesulfonic acid and p-toluenesulfonic acid. Acids that are preferred sources of anions for the catalyst composition are trifluoroacetic acid and p-toluenesulfonic acid. The anion is preferably provided as the free acid but alternatively is provided as a metal salt, particularly a non-noble transition metal salt, e.g., a copper salt or a nickel salt. However provided, the anion is employed in a quantity from about 1 mole to about 100 moles per mole of palladium. Preferred quantities of anion are from about 2 moles to about 50 moles per mole of palladium.

The tetraalkyl diphosphine ligands employed as catalyst composition precursors are represented by the formula

 (III)

wherein R independently is alkyl of up to 10 carbon atoms inclusive, preferably up to 6 carbon atoms inclusive. Illustrative of suitable R groups are methyl, ethyl, propyl, n-butyl, isobutyl, hexyl, octyl and decyl. It is often preferred that all R groups are the same and particularly preferred as each R group is n-butyl. The R' group is a divalent linking group of up to 10 carbons inclusive with from 2 to 4 carbon atoms in the phosphorus-phosphorus bridge. The preferred R' groups have from 2 to 5 carbon atoms inclusive and are illustrated by 1,2-ethylene, 1,2-propylene, 1,3-propylene, 2,2-dimethyl-1,3-propylene and 1,4-butylene. The preferred R' group is 1,3-propylene and the preferred tetraalkyl diphosphine ligand is 1,3-bis(di-n-butylphosphino)propane. The quantity of phosphine ligand is suitable from about 0.5 mole to about 2 moles of ligand per mole of palladium, preferably from about 0.75 mole to about 1.5 mole per mole of palladium.

Typical polymerization conditions include a reaction temperature from about 25° C. to about 150° C. but preferred reaction temperatures are from about 30° C. to about 130° C. The reaction pressure is suitably from about 2 bar to about 150 bar although reaction pressures from about 5 bar to about 100 bar are more frequently encountered. The polymerization is conducted in the presence of a reaction diluent. Suitable reaction diluents include lower alkanols such as methanol or ethanol and lower alkanones such as acetone or methyl ethyl ketone. Methanol is preferred as the reaction diluent.

It is useful on occasion to include within the reaction mixture an organic oxidizing agent such as a quinone, an aliphatic nitrite such as butyl nitrite or an aromatic nitro compound such as nitrobenzene or 2,4-dinitrotoluene. The class of quinones is preferred as the oxidizing agent, both 1,2-quinones and 1,4-quinones. Illustrative of suitable quinones are benzoquinone, naphthoquinone or anthraquinone. Particularly preferred is 1,4-benzoquinone or 1,4-naphthoquinone. As stated, the presence of an oxidizing agent is optional and not required, but amounts of oxidizing agent up to about 5000 mole per mole of palladium are suitable. When present, amounts of oxidizing agent from about 5 moles to about 1000 moles per mole of palladium are preferred.

During the reactant/catalyst composition contacting the molar ratio of carbon monoxide to total ethylenically unsaturated compound is from about 10:1 to about 1:10. Preferred molar ratios of carbon monoxide to total ethylenically unsaturated compound are from about 5:1 to about 1:5. The quantity of catalyst composition to be employed is sufficient to provide from about $1 \times 10^{-7}$ mole to about $1 \times 10^{-3}$ mole of palladium per mole of total ethylenically unsaturated compound. Preferred quantities of catalyst composition provide from about $1 \times 10^{-6}$ mole to about $1 \times 10^{-4}$ mole of palladium per mole of total unsaturated compound.

During polymerization the reactant contacting/catalyst composition contacting is facilitated by some means of agitation such as shaking or stirring. Subsequent to polymerization the reaction is terminated as by cooling the reactor and contents and releasing the pressure. The linear alternating polymer is observed as a material substantially insoluble in the reaction diluent and is recovered by conventional methods such as filtration or centrifugation. The polymer is purified, if desired, as by contact with a solvent or extracting agent selective for catalyst residues.

The polymers of the invention are thermoplastic and have utilities associated with the thermoplastic polymers. They are characterized by the presence of functional groups in addition to carbonyl pendant along the polymer chain. They are convertible by conventional chemical techniques into derivatives such as polyols, polyacids, polyamines, and polyamides having additional beneficial properties. By virtue of the higher molecular weight of the polymers of the invention, typically above about 7,000 as compared with the products of published European Patent Application 376,364, the polymers will have generally higher melting points and greater utility as structural plastics.

The invention is further illustrated by the following Comparative Examples (not of the invention) and the Illustrative Embodiments which should not be regarded as limiting. The polymers obtained in the Comparative Experiments and the Illustrative Embodiments were examined by $^{13}$C-NMR analysis which indicated the polymers were linear alternating. Gas-liquid chromatography was used to determine the molecular weight of the polymers.

COMPARATIVE EXAMPLE I

Into an autoclave of 250 ml capacity equipped with a mechanical stirrer was placed a catalyst composition solution containing 30 ml methanol, 0.1 mmol palladium acetate, 0.5 mmol copper p-toluenesulfonate and 0.15 mmol 1,3-bis(diphenylphosphino)propane. After 30 ml of methyl acrylate was introduced, the air in the autoclave was evacuated and carbon monoxide was introduced until a pressure of 40 bar was reached. The autoclave and contents were heated to 90° C. and maintained at that temperature for 5 hours. The autoclave and contents were then cooled to room temperature and the pressure was released. Only traces of a polymeric material were obtained.

COMPARATIVE EXAMPLE II

A copolymer of carbon monoxide and methyl 10-undecenoate was produced by a procedure substantially similar to that of Comparative Example I except that the catalyst composition solution contained 30 ml methanol, 0.5 mmol palladium acetate, 0.5 mmol copper p-toluenesulfonate and 0.75 mmol 1,3-bis(diphenylphosphino)propane, 30 ml of methyl 10-undecenoate was added instead of methyl acrylate and the reaction temperature was 50° C. instead of 90° C. The yield of copolymer was 11 g and the copolymer had a mean molecular weight, $\overline{M}_w$, of approximately 800.

COMPARATIVE EXAMPLE III

A copolymer of carbon monoxide and 10-undecenyl alcohol was produced by a procedure substantially similar to that of Comparative Example I except that the catalyst composition solution contained 50 ml methanol, 0.5 mmol palladium acetate, 2 mmol copper p-toluenesulfonic acid and 0.75 mmol 1,3-bis(diphenylphosphino)propane, 20 ml of 10-undecenyl alcohol were used instead of methyl acrylate and the reaction temperature was 70° C. instead of 90° C. The yield of copolymer was 8 g and the copolymer had a mean molecular weight of approximately 500.

ILLUSTRATIVE EMBODIMENT I

A copolymer of carbon monoxide and 10-undecenoic acid was produced by a procedure substantially similar to that of Comparative Example I except that the catalyst composition solution contained 5 ml methanol, 100 ml tetrahydrofuran, 0.1 mmol palladium acetate, 0.5 mmol nickel perchlorate, 0.12 mmol 1,3-bis(di-n-butylphosphino)propane and 6 mmol naphthoquinone, 40 ml of 10-undecenoic acid were used instead of methyl acrylate, the reaction temperature was 50° C. instead of 90° C. and the reaction time was 10 hours instead of 5 hours. The yield of copolymer was 35 g and the copolymer had a mean molecular weight of approximately 16,000.

ILLUSTRATIVE EMBODIMENT II

A copolymer of carbon monoxide and 3-butenol-1 was produced by a procedure substantially similar to that of Illustrative Embodiment I except that 30 ml of 3-butenol-1 was used instead of 10-undecenoic acid. The yield of copolymer was 20 g and the copolymer had a mean molecular weight of approximately 10,000.

What is claimed is:

1. A process for producing a linear alternating polymer of carbon monoxide, a functionally-substituted ethylenically unsaturated compound, and an ethylenically unsaturated hydrocarbon comprising contacting carbon monoxide, a functionally-substituted ethylenically unsaturated compound having at least one carbon atom between the functional substitution and the ethylenic unsaturation, and an ethylenically unsaturated hydrocarbon compound under polymerization conditions, in the presence of a reaction diluent and a catalyst composition formed from a compound of palladium, the anion of a strong non-hydrohalogenic acid, and a tetraalkyl disphosphine ligand.

2. The process of claim 1 wherein the diphosphine ligand is represented by the formula

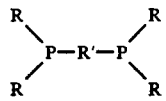

wherein R independently is alkyl of up to 10 carbon atoms and R' is a divalent linking group of up to 10 carbon atoms with from 2 to 4 carbon atoms inclusive in the bridge.

3. The process of claim 2 wherein the functionallysubstituted compound is represented by the formula

wherein n is a number from 1 to 14 inclusive and Z is —OY', —CO$_2$Y', —COY or —OCOY wherein Y is alkyl of up to 4 carbon atoms inclusive and Y' is hydrogen or Y.

4. The process of claim 3 wherein R is alkyl of up to 6 carbon atoms inclusive and R' has from 2 to 5 carbon atoms inclusive.

5. The process of claim 4 wherein R' is 1,3-propylene.

6. The process of claim 5 wherein the functionally-substituted compound is an alcohol or a carboxylic acid.

7. The process of claim 6 wherein each R is n-butyl.

8. The process of claim 7 wherein the functionally-substituted compound is 3-butenol-1.

9. The process of claim 7 wherein the functionally-substituted compound is 10-undecenoic acid.

10. A process for producing a linear alternating copolymer of carbon monoxide and a functionally-substituted ethylenically unsaturated compound comprising contacting carbon monoxide and a functionally-substituted ethylenically unsaturated compound having at least one carbon atom between the functional substitution and the ethylenic unsaturation, under polymerization conditions, in the presence of a reaction diluent and a catalyst composition formed from palladium acetate, the anion of trifluoroacetic acid or p-toluenesulfonic acid, and a tetraalkyl diphosphine ligand.

11. The process of claim 10 wherein the diphosphine ligand is represented by the formula

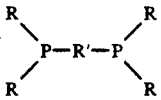

wherein R independently is alkyl of up to 10 carbon atoms and R' is a divalent linking group of up to 10 carbon atoms with from 2 to 4 carbon atoms inclusive in the bridge.

12. The process of claim 11 wherein the functionally-substituted compound is represented by the formula

wherein n is a number from 1 to 14 inclusive and Z is $-OY'$, $-CO_2Y'$, $-COY$ or $-OCOY$ wherein Y is alkyl of up to 4 carbon atoms inclusive and Y' is hydrogen or Y.

13. The process of claim 12 wherein R is alkyl of up to 6 carbon atoms inclusive and R' has from 2 to 5 carbon atoms inclusive.

14. The process of claim 13 wherein R' is 1,3-propylene.

15. The process of claim 14 wherein the functionally-substituted compound is an alcohol or a carboxylic acid.

16. The process of claim 15 wherein each R is n-butyl.

17. The process of claim 16 wherein the functionally-substituted compound is 3-butenol-1.

18. The process of claim 16 wherein the functionally-substituted compound is 10-undecenoic acid.

* * * * *